United States Patent Office 3,518,279
Patented June 30, 1970

3,518,279
THIAZOLYLPHENYL PHOSPHATES
Bernard Miller, Princeton, N.J., assignor to American Cyanamid Company, Stamford, Conn., a corporation of Maine
No Drawing. Filed Aug. 29, 1967, Ser. No. 663,971
Int. Cl. C07d 91/32
U.S. Cl. 260—302      8 Claims

ABSTRACT OF THE DISCLOSURE

Pesticidal compounds of the formula:

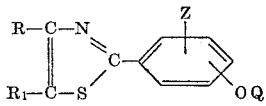

wherein Q is

X is either oxygen or sulfur, Y is lower alkyl, lower alkoxy, lower alkylthio, halo-substituted lower alkyl, halo-substituted lower alkoxy, phenyl or lower alkylamino and each Y may be the same or different, Z is hydrogen, lower alkyl or halo, R is hydrogen, lower alkyl or phenyl, and $R_1$ stands for hydrogen, lower alkyl, cyano, carb(lower)alkoxy or acetyl are disclosed. They may be prepared from the hydroxy thiazole compounds having the above formula wherein Q is H.

---

The present invention relates to novel phenylthiazoles and method for preparing the same. More particularly, it relates to compounds of the structure:

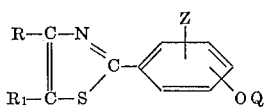

wherein Q is

X is either oxygen or sulfur, Y is lower alkyl, lower alkoxy, lower alkylthio, halo-substituted lower alkyl, halo-substituted lower alkoxy, phenyl or lower alkylamino and each Y may be the same or different, Z is hydrogen, lower alkyl or halo, R is hydrogen, lower alkyl or phenyl, and $R_1$ stands for hydrogen, lower alkyl, cyano, carb(lower)alkoxy or acetyl.

In general, the compounds of the present invention may be synthesized conveniently by the initial preparation of an appropriate hydroxyphenylthiazole and, thereafter, effecting reaction between the latter and a phosphorus-containing compound, such as an O,O-dialkylphosphorohalothioate, O,O-dialkylphosphorohaloate, O-alkyl alkanephosphonohalothioate, O-alkyl - N - monoalkylphosphoroamidohaloate, O-alkyl-N,N-dialkylphosphoroamidohalothiate, N,N' - dialkylphosphorodiamidohalothiate, O-alkyl phenylphosphonohalothiate, O,O-diphenylphosphorohaloate, or the like.

The over-all reaction may be graphically written as:

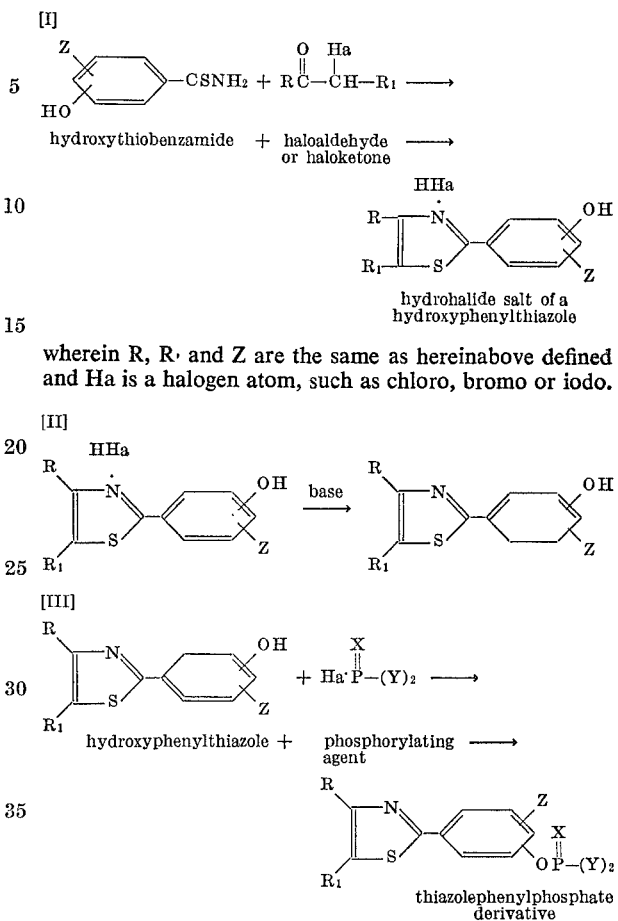

The hydroxythiobenzamides employed in Reaction I above include illustratively:

p-Hydroxythiobenzamide,
3-chloro-4-hydroxythiobenzamide,
m-Hydroxythiobenzamide,
o-Hydroxythiobenzamide,
3-hydroxy-5-ethylthiobenzamide,
2-chloro-4-hydroxythiobenzamide, and
2-hydroxy-5-bromothiobenzamide.

An equivalent amount of the latter is reacted with a haloaldehyde or haloketone, usually at temperatures between 0° C. and 100° C.

Exemplary haloaldehydes or haloketones employed in Reaction I are: chloroacetone, bromoacetone, 2-chloroacetaldehyde, 1-phenyl - 2 - chloroacetaldehyde, methyl ester of α-chloroacetoacetic acid, ethyl ester of α-chloroacetoacetic acid, 3-aceto-3-chloroacetone, 3-aceto-3-bromoacetone, ethyl ester of α-chloro-α-methylacetoacetic acid, 2-methyl-2-chloroacetaldehyde, and 3-chloro-3-cyanoacetone.

It is a good practice to carry out the process illustrated by Reaction I in the presence of a suitable solvent, such as ether, benzene, toluene, methyl alcohol or ethyl alcohol.

It has been found that the illustrated reactions above can be carried out in sequence without separation of the several reaction products, or they may be conducted stepwise. Advantageously, the reaction of Reaction II is carried out in the presence of an acid acceptor which may be an inorganic or organic base, and usually in the presence of a suitable solvent, such as water, ethyl alcohol, n-propyl alcohol, t-butyl alcohol, ethyl acetate, butyl acetate, methyl isobutyl ketone, methyl ethyl ketone, ethylene glycol, dimethyl ether and benzene. Contemplated bases are, for example, sodium hydroxide, potassium hydroxide, sodium carbonate, triethyl amine, potassium butoxide and sodium acetate. Base sufficient to neutralize the hydrohalide salt of the hydroxyphenylthiazole and the acid formed during reaction is provided for optimum results. Illustrative of the latter compounds prior to neutralization are:

2-p-hydroxyphenyl-4-methylthiazole hydrochloride,
2-p-hydroxyphenyl-4-methyl-5-carbethoxythiazole hydrobromide,
2-p-hydroxyphenylthiazole hydrochloride,
2-m-hydroxyphenylthiazole hydrochloride,
2-o-hydroxyphenyl-4-methylthiazole hydrochloride,
2-[3-hydroxy-5-ethyl]phenyl-4-methyl-5-carbethoxythiazole hydrochloride,
2-[2-chloro-4-hydroxy]phenyl-4,5-methylthiazole hydrochloride,
2-[2-hydroxy-5-bromo]phenyl-4-methyl-5-acetylthiazole hydrochloride,
2-m-hydroxyphenyl-4-ethyl-5-carbethoxythiazole hydrochloride,
2-p-hydroxyphenyl-5-methylthiazole hydrochloride,
2-p-hydroxyphenyl-5-cyano-4-methylthiazole hydrochloride, and
2-p-hydroxyphenyl-4-phenylthiazole hydrochloride.

These compounds find utility as intermediates in the preparation of insecticidal thiazolylphenyl phosphates.

In general, there may be employed as phosphorohaloate reactants employed in Reaction III above the following:

O,O-dimethylphosphorochloridothioate,
O,O-diethyl phosphorochloridothioate,
O-methyl, O-ethyl phosphorochloridothioate,
O,O-di-iso-propyl phosphorobromidothioate,
O,O-di-n-butyl phosphorochloridothioate,
O,O-di-sec-pentyl phosphorochloridothioate,
O,O-dimethyl phosphorochloridate,
O,O-diethyl phosphorochloridate,
O-ethyl ethyl phosphonochloridothioate,
O-ethyl-N,N-dimethyl phosphoramidochloridothioate,
O-ethyl, phenylphosphonochloridothioate,
O-ethyl-N-isopropyl phosphoramidochloridothioate,
O-ethyl-N-methyl phosphoramidochloridothioate,
Diethylphosphorochloridotrithioate, and
Diethylphosphinothioyl bromide.

Typical thiazolephenyl phosphates or thiophosphates are, for instance:

O,O-diethyl-O-p-(4-methyl-2-thiazolyl)phenyl phosphorothioate,
O,O-dimethyl-O-p-(4-methyl-2-thiazolyl)phenyl phosphorothioate,
O,O-diethyl-O-p-(4-methyl-2-thiazolyl)phenyl phosphate,
O,O-diethyl-O-p-(2-thiazolyl)phenyl phosphorothioate,
O,O-dimethyl-O-p-(2-thiazolyl)phenyl phosphorothioate,
O,O-diethyl-O-p-(4-methyl-5-carbethoxy-2-thiazolyl)phenyl phosphorothioate,
O,O-dimethyl-O-p-(4-methyl-5-carbethoxy-2-thiazolyl)phenyl phosphorothioate,
O,O-dimethyl-O-m-(2-thiazolyl)phenyl phosphorothioate,
Diethyl-o-(4-methyl-2-thiazolyl)phenyl phosphate,
O,O-dimethyl-O-3-(4-methyl-5-carbethoxy-2-thiazolyl)-5-ethylphenyl phosphorothioate,
Diethyl-4-(4,5-methyl-2-thiazolyl)-2-chlorophenyl phosphate,
O,O-dimethyl-O-2-(4-cyano-5-acetyl-2-thiazolyl)-5-bromophenyl phosphorothioate,
Bis-dimethylamino-O-p-(2-thiazolyl)phenyl phosphorothioate,
Di-ethylthio-m-(4-ethyl-5-carbethoxy-2-thiazolyl)phenyl phosphate,
Bis-chloromethyl-p-(4-methyl-2-thiazolyl)phenyl phosphate,
Di-phenyl-p-(5-methyl-2-thiazolyl)phenyl phosphate,
O,O-dimethyl-O-p-(5-cyano-4-methyl-2-thiazolyl)phenyl phosphorothioate, and
O,O-dimethyl-O-p-(4-phenyl-2-thiazolyl)phenyl phosphorothioate The thiazolylphenyl phosphates or thiophosphates of the present invention find utility as insecticides, acaricides and as nematocides.

To facilitate a further understanding of the present invention, the following illustrative examples are presented. These are not to be taken as limitative of the invention. Unless otherwise stated, the parts are by weight and the analyses are in percent.

EXAMPLE 1

Preparation of 2-p-hydroxyphenyl-4-methylthiazole hydrochloride

Chloroacetone (3.05 parts) is added to a solution of p-hydroxythiobenzamide (5.0 parts) in ethyl alcohol. The solution is refluxed for 2.5 hours, then cooled in ice and filtered to give 3.8 parts of golden yellow solid, melting point 248° C.–252° C. The mother liquors are evaporated to one third their volume to give an additional 1.3 parts of product. The product is recrystallized from ethyl alcohol to give material melting at 249° C.–253° C.

*Analysis.*—Calcd. for $NOSClC_{10}H_{10}$ (percent): C, 52.8; H, 4.39; N, 6.16; S, 13.4; Cl, 15.6. Found (percent): C, 53.4; H, 4.30; N, 5.85; S, 12.9; Cl, 14.5.

EXAMPLE 2

Preparation of 2-p-hydroxyphenyl-4-methyl-5-carbethoxythiazole hydrobromide

The same procedure is followed as in Example 1 except the chloroacetone is replaced with the ethyl ester of α-bromo acetoacetic acid ($CH_3COCHBrCO_2C_2H_5$) resulting in a 59% yield of product which is recrystallized from methanol to give a yellow solid, melting point of 207° C.–209° C.

*Analysis.*—Calc'd for $NSO_3C_{13}H_{14}Br$ (percent): C, 45.4; H, 4.07; N, 4.07; S, 9.30. Found (percent): C, 43.42; H, 4.13; N, 4.13; S, 10.01.

EXAMPLE 3

Preparation of 2-p-hydroxyphenylthiazole hydrochloride

The same procedure is followed as in Example 1 except the chloroacetone is replaced by chloroacetaldehyde yielding the desired product which, when recrystallized from a methanol-acetone solution, has a melting point of 190° C.–192° C.

*Analysis.*—Calc'd for $C_9H_{18}SNOCl$ (percent): C, 50.7; H, 3.78; N, 6.58; S, 15.02; Cl, 16.62. Found (percent): C, 50.43; H, 4.08; N, 6.71; S, 15.00; Cl, 16.48.

EXAMPLE 4

Preparation of O,O-diethyl-O-p-(4-methyl-2-thiazolyl)-phenyl phosphorothioate 3.0 parts of 2-p-hydroxyphenyl-4-methylthiazole hydrochloride are added to a solution of 2.95 parts of potassium t-butoxide in t-butylalcohol. The mixture is stirred for 20 minutes; then heated on a steam bath until a homogeneous solution is obtained. 2.50 parts of O,O-diethylphosphorochloridothioate are added and the mixture stirred at room temperature for 16 hours. Water is then added to the solution, which is extracted with methylene chloride. The methylene chloride layer is evaporated to give 4.1 parts of yellow oil, $n_D^{25}=1.5815$. The nuclear magnetic resonance and infrared spectra of the product are in agreement with the assigned structure.

*Analysis.*—Calc'd for $NPS_2O_3C_{14}H_{18}$ (percent): C, 48.5; H, 5.31; N, 4.13; S, 18.9; P, 9.16. Found (percent): C, 48.90; H, 5.33; N, 4.16; S, 18.60; P, 8.95.

EXAMPLE 5

Preparation of O,O-dimethyl-O-p-(4-methyl-2-thiazolyl)phenyl phosphorothioate

The same procedure is followed as in Example 4 except that O,O-diethylphosphorochloridothioate is replaced by O,O-dimethylphosphorocloridothioate. The product has an $n_D^{25}=1.6002$.

Analysis.—Calc'd for $PNS_2O_3C_{12}H_{14}$ (percent): C, 45.7; H, 4.44; N, 4.44; S, 20.3; P, 9.84. Found (percent): C, 45.75; H, 4.46; N, 4.39; S, 20.38; P, 9.91.

EXAMPLE 6

Preparation of O,O-diethyl-O-p-(4-methyl-2-thiazolyl)-phenyl phosphate

The procedure is followed as in Example 4 in every detail except that O,O-diethylphosphorochloridothioate is replaced by O,O-diethylphosphorochloridate. The product has an $n_D^{25}=1.5495$.

Analysis.—Calc'd for $NPSO_4C_{14}H_{18}$ (percent): C, 51.4; H, 5.50; N, 4.28; P, 9.48; S, 9.78. Found (percent): C, 48.12; H, 4.60; N, 4.26; P, 9.41; S, 9.54.

EXAMPLE 7

Preparation of O,O-diethyl-O-p-(2-thiazolyl)phenyl phosphorothioate

The procedure is followed as in Example 4 in every detail except that the 2-p-hydroxyphenyl-4-methylthiazole hydrochloride is replaced by 2-p-hydroxyphenyl-4-thiazole hydrochloride. The product has an $n_D^{25}=1.5732$.

Analysis.—Calc'd for $C_{13}H_{16}PNS_2O_3$ (percent): C, 4.75; H, 4.90; N, 4.26; S, 19.48; P, 9.41. Found (percent): C, 46.61; H, 4.86; N, 3.95; S, 18.66; P, 9.18.

EXAMPLE 8

Preparation of O,O-diethyl-O-p-(2-thiazolyl)phenyl phosphorothioate

Repeating Example 5 in every detail except that the 2-p-hydroxyphenyl-4-methylthiazole hydrochloride is replaced by 2-p-hydroxyphenyl-4-thiazole hydrochloride. The product has an $n_D^{25}=1.6057$.

Analysis.—Calc'd for $C_{11}H_{12}PNS_2O_3$ (percent): C, 43.9; H, 4.02; N, 4.66; S, 21.25; P, 10.2. Found (percent): C, 43.47; H, 4.41; N, 4.83; S, 21.96; P, 10.63.

EXAMPLE 9

Preparation of O,O-diethyl-O-p-(4-methyl-5-carbethoxy-2-thiazolyl)phenyl phosphorothioate The procedure is followed as in Example 4 except the 2-p-hydroxyphenyl-4-methylthiazole hydrochloride is replaced by 2 - p - hydroxyphenyl-4-methyl-5-carbethoxy-thiazole hydrobromide. The product has an $n_D^{25}=1.5685$.

Analysis.—Calc'd for $PNS_2O_5C_{17}H_{22}$ (percent): C, 49.2; H, 5.30; N, 3.38; S, 15.4; P, 7.47. Found (percent): C, 49.20; H, 5.39; N, 3.39; S, 15.53; P, 7.49.

EXAMPLE 10

Preparation of O,O-dimethyl-O-p-(4-methyl-5-carbethoxy-2-thiazolyl)phenyl phosphorothioate The procedure is followed as in Example 5 except the 2-p-hydroxyphenyl-4-methylthiazole hydrochloride is replaced by 2 - p - hydroxyphenyl-4-methyl-5-carbethoxy-thiazole hydrobromide.

Analysis.—Calc'd for $C_{15}H_{18}PNS_2O_5$ (percent): C, 46.6; H, 4.66; N, 3.62; S, 16.55; P, 8.0. Found (percent): C, 45.28; H, 4.94; N, 3.80; S, 16.76; P, 7.80.

EXAMPLE 11

A variety of thiazolylphenyl phophorothioates and phosphoroates are prepared by the procedure of Example 10 as by reacting an appropriately substituted hydroxy phenylthiazole hydrohalide with the appropriate phosphorochloridothioate or phosphorochloridate as follows:

(A) 2-m-hydroxyphenyl-thiazole hydrochloride and dimethylphosphorochloridothioate to yield O,O-dimethyl-O-m-2-thiazolyl)phenyl phosphorothioate;

(B) 2-o-hydroxyphenyl-4-methylthiazole hydrochloride and diethylphosphorochloride to yield diethyl - o - (4-methyl-2-thiazolyl)phenyl phosphate;

(C) 2,3-hydroxy-5-ethylphenyl-4-methyl-5-carbethoxy-thiazole hydrochloride and dimethylphosphorochloridothioate to yield O,O-dimethyl-O-3-(4-methyl-5-carbethoxy-2-thiazolyl)-5-ethylphenyl phosphorothioate;

(D) 2,2 - chloro - 4-hydroxyphenyl-4,5-methylthiazole hydrochloride and diethylphosphonyl chloridate to yield diethyl-4-(4,5-methyl-2-thiazolyl) - 2 - chlorophenyl phosphate;

(E) 2,2-hydroxy-5-bromophenyl-4-methyl-5-acetylthiazole hydrochloride and dimethylphosphorochloridothioate to yield O,O-dimethyl-O-2-(4-cyano-5-acetyl-2-thiazolyl)-5-bromophenyl phosphorothioate;

(F) 2-p-hydroxyphenylthiazole hydrochloride and di-dimethylaminophosphonylchloridothioate to yield di-dimethylamino - O-p-(2-thiazolyl)phenyl phosphorothioate;

(G) 2 - m-hydroxyphenyl-4-ethyl-5-carbethoxythiazole-hydrochloride and di - ethylthiophosphonylchloridate to yield di-ethylthio-m - 4 - ethyl-5 - carbethoxy-2-thiazolyl)-phenyl phosphate;

(H) 2-p-hydroxyphenyl-4-methylthiazole hydrochloride and di-chloromethylphosphonylchloridate to yield dichloromethyl-p-(4-methyl-2-thiazolyl)phenyl phosphate;

(I) 2-p-hydroxyphenyl-5-methylthiazole hydrochloride and di-phenylphosphonylchloridothioate to yield di-phenyl-p-(5-methyl-2-thiazolyl)phenyl phosphate;

(J) 2-p-hydroxyphenyl - 5 - cyano-4-methylthiazole hydrochloride and dimethylphosphorochloridothioate to yield O,O - dimethyl-O-p-(5-cyano-4-methyl-2-thiazolyl)-phenyl phosphorothioate; and (K) 2-p-hydroxyphenyl-4-phenylthiazole hydrochloride and dimethylphosphorochloridothioate to yield O,O-dimethyl-O-p-(4-phenyl-2-thiazolyl)phenyl phosphorothioate.

Application of the phosphorylated derivatives synthesized from the compounds of the invention for purposes of insecticide control can be accomplished employing both conventional type formulations and equipment. The compounds may, for instance, be formulated as wettable powders, dusts, dust concentrates, emulsifiable concentrates and the like, which are amenable to application with conventional spraying or dusting apparatus.

Wettable powder formulations are generally prepared by admixing from about 25% to about 95%, by weight, of active ingredient with finely ground clay, such as kaolin or attapulgite, either with or without a surface active agent, emulsifier or spreader-sticker. The latter is then dispersed in water for spray application.

Dusts and dust concentrates are similarly prepared using from about 5% to about 85% of active ingredient and from about 95% to about 5% of finely divided inert ingredients. These dusts are generally applied as such, or they may be further diluted with finely ground inert solids and then applied with conventional dusting apparatus.

Emulsifiable concentrates may be prepared by dissolving or dispersing the active ingredient in organic solvent, with or without emulsifying agents, surfactants or the like. Such formulations are then diluted with either water or an appropriate organic diluent prior to application.

The insecticidal activity of the compounds of this invention upon various insect species is evaluated using the following methods:

(1) Bean aphid—*Aphis fabae* Scopoli: Compounds are tested as 0.1% solutions or suspensions in 65% acetone-35% water. Two-inch fiber pots, each containing a nasturtium plant two inches high and infested with about 150 aphids two days earlier, are placed on a turntable (4 r.p.m.) and sprayed for two revolutions with a No. 154 DeVilbiss Atomizer at 20 p.s.i. air pressure. The spray tip is held about six inches from the plants and the spray is directed so as to give complete coverage of the aphids and the plants. The sprayed plants are laid on their sides on white enamel trays which have had the edges coated with No. 50 SAE oil as a barrier. Mortality estimates are made after holding for two days at 70° F., and 50% R.H. Compounds producing greater than 75% kill are further tested at tenfold dilutions in 65% acetone-35% water.

(2) Southern armyworm—*Prodenia eridania* (Cramer): The solutions from the aphid test are also used for this one. Sieva lima bean primary leaves are dipped for three seconds in the test solution and set in a hood on a screen to dry. When dry, each leaf is placed in a 4-inch petri dish which has a moist filter paper in the bottom and ten third-instar armyworm larvae about ⅜″ long. The dishes are covered and held at 80° F., and 60% R.H. After 2 days, mortality counts and estimates of the amount of feeding are made. Compounds showing partial kill and/or inhibition of feeding are held an extra day for further observations. Those materials which produce greater than 50% mortality or which inhibit feeding are further tested at ten-fold dilutions in 65% acetone-35% water.

(3) Two-spotted spider mite —*Tetranychus urticae* (Koch): Sieva lima bean plants with primary leaves three to four inches long are infested with about 100 adult mites per leaf four hours before use in this test. The mite and egg infested plants are dipped for three seconds in a .01% solution prepared as in the above tests, and the plants set in the hood to dry. They are held for two days at 80° F., 60% R.H., and the adult mite mortality estimated on one leaf under a stereoscopic microscope. The other leaf is left on the plant an additional five days and then examined at 10× power to estimate the kill of eggs and of newly-hatched nymphs, giving a measure of ovicidal and residual action, respectively.

(4) Confused flour beetle — *Tribolium confusum* Jacquelin duVal: Compounds are formulated as 1% dusts by mixing 0.1 gram of the compound with 9.9 grams of Pyrax ABB talc, wetting with 5 ml. of acetone and grinding with a mortar and pestle until dry. 125 mg. of this 1% dust is then blown into the top of a dust settling tower with a short blast of air at 20 p.s.i. The dust is allowed to settle on four-inch petri dishes for two minutes, giving a deposit of approximately 87 mg./sq. foot (.094 mg./sq. cm.) of the 1% dust. The dishes are removed and 25 adult confused flour beetles are added immediately. The dishes are held for three days at 80° F. and 60% R.H., following which mortality counts are made.

(5) Large milkweed bug—*Oncopeltus fasciatus* Dallas: The 1% dusts described above are used in this test. 25 mg. of the 1% dust is sprinkled evenly over the glass bottom of a seven-inch diameter cage, using a screen-bottom plastic cup about ⅝-inch in diameter as an applicator, giving a deposit of approximately 94 mg./sq. foot (.108 mg./sq. cm.) of the 1% dust. Water is supplied in a two-ounce bottle with a cotton wick, twenty adult bugs are added and a screen cover placed on the top. Mortality counts are made after holding for three days at 80° F. and 60% R.H.

(6) Common malaria mosquito—*Anopheles quadrimaculatus* Say Larvicide test: Groups of 25 larvae of the common malaria mosquito are transferred with a medicine dropper to a 50 ml. beaker containing 25 ml. of water. The test compound is formulated as an emulsion containing 0.1 gram of test material, 0.2 gram of Alrodyne 315 emulsifier, 10 ml. of acetone and 90 ml. of water. This 1000 p.p.m. emulsion is diluted ten-fold with 65% acetone-35% water to give 100 p.p.m. One milliliter of the 100 p.p.m. emulsion is pipetted into 225 ml. of water

TABLE I.—EFFICACY AGAINST VARIOUS INSECT SPECIES, EXPRESSED AS PERCENT MORTALITY

| Structure | Aphids .1% | Aphids .01% | Southern armyworm .1% | Southern armyworm .01% | Spider mite, .01% | Flour beetle, 1% | Milkweed bug, 1% | Mosquito, .4 p.p.m. | Housefly, 50 p.p.m. | Southern corn rootworm, 50 lb./acre |
|---|---|---|---|---|---|---|---|---|---|---|
| $(C_2H_5O)_2-\overset{S}{\underset{\|}{P}}-O-\langle\text{phenyl}\rangle-\text{thiazoline-}CH_3$ | 90 | 0 | —— | 0 | 0 | 66 | 0 | 100 | 100 | 50 |
| $(CH_3O)_2-\overset{O}{\underset{\|}{P}}-O-\langle\text{phenyl}\rangle-\text{thiazoline-}CH_3$ | 100 | 90 | —— | 0 | 0 | 100 | 0 | 100 | 100 | 100 |
| $(C_2H_5O)_2-\overset{O}{\underset{\|}{P}}-O-\langle\text{phenyl}\rangle-\text{thiazoline-}CH_3$ | 100 | 100 | —— | 0 | 92 | 48 | 80 | 24 | 100 | 50 |
| $(CH_3O)_2-\overset{S}{\underset{\|}{P}}-O-\langle\text{phenyl}\rangle-\text{thiazoline-}CH_3, CO_2C_2H_5$ | 100 | 0 | —— | 0 | —— | —— | —— | —— | —— | —— |
| $(C_2H_5O)_2-\overset{S}{\underset{\|}{P}}-O-\langle\text{phenyl}\rangle-\text{thiazoline-}CH_3, CO_2C_2H_5$ | 10 | 0 | —— | 0 | 0 | 0 | 0 | 20 | 100 | 80 |
| $(C_2H_5O)_2-\overset{S}{\underset{\|}{P}}-O-\langle\text{phenyl}\rangle-\text{thiazoline}$ | 100 | 50 | 100 | 30 | 100 | 100 | 100 | 100 | 100 | 100 |
| $(CH_3O)_2-\overset{O}{\underset{\|}{P}}-O-\langle\text{phenyl}\rangle-\text{thiazoline}$ | 100 | 99 | 100 | 30 | 37 | 100 | 15 | —— | 100 | 100 |
| $(C_2H_5O)_2-\overset{O}{\underset{\|}{P}}-O-\langle\text{phenyl}\rangle-\text{thiazoline}$ | 100 | 50 | 100 | 90 | 95 | 82 | 100 | 0 | 100 | 65 | in a 400 ml. beaker and stirred vigorously. The larvae in 25 ml. of water are added, giving a concentration of 0.4 p.p.m. Mortality counts are made after 24 hours at 80° F.

(7) Housefly—*Musca domestica* Linnaeus: Groups of 25 adult female houseflies are lightly anesthetized with $CO_2$, placed in wide-mouth pint mason jars, and covered with a screen cap. The test compound is formulated as an emulsion containing 0.1 gram of test material, 0.2 gram of Alrodyne 315 emulsifier, 10 ml. of acetone and 90 ml. of water. Two milliliters of this emulsion are diluted to 40 ml. with 10% sugar solution in a 10-gram glass vial, giving a concentration of 50 p.p.m. The mouth of the vial is covered with a single layer of cheesecloth, inverted and placed on the screen cap, so that the flies can feed on the solution through the screen. Mortality counts are made after two days at 80° F.

(8) Southern corn rootworm—*Diabrotica undecimpunctata howardi* Barber: The compound is formulated as a dust and incorporated into the soil at the equivalent of 50 pounds per 6-inch acre. The soil is sub-sampled into one-ounce wide mouth bottles, and ten 6- to 8-day old rootworm larvae added to each bottle, which is then capped. Mortality counts are made after six days at 80° F., 60% R.H.

A summary of the data produced in the above tests is presented on the preceding page in Table I for certain compounds of this invention.

I claim:
1. A compound of the formula:

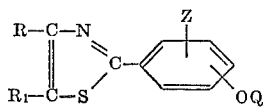

wherein Q is

X is either oxygen or sulfur, Y is lower alkyl, lower alkoxy, lower alkylthio, halo-substituted lower alkyl, halo-substituted lower alkoxy, phenyl or lower alkylamino and each Y may be the same or different, Z is hydrogen, lower alkyl or halo, R is hydrogen, lower alkyl or phenyl, and $R_1$ stands for hydrogen, lower alkyl, cyano, carb(lower)-alkoxy or acetyl.

2. The compound according to claim 1: O,O-diethyl-O-p-(4-methyl-2-thiazolyl)phenyl phosphorothioate.

3. The compound according to claim 1: O,O-dimethyl-O-p-(4-methyl-2-thiazolyl)phenyl phosphorothioate.

4. The compound according to claim 1: O,O-diethyl-O-p-(4-methyl-2-thiazolyl)phenyl phosphate.

5. The compound according to claim 1: O,O-diethyl-O-p-(2-thiazolyl)phenyl phosphorothioate.

6. The compound according to claim 1: O,O-dimethyl-O-p-(2-thiazolyl)phenyl phosphorothioate.

7. The compound according to claim 1: O,O-diethyl-O-p-(4-methyl-5-carbethoxy-2-thiazolyl)phenyl phosphorothioate.

8. The compound according to claim 1: O,O-dimethyl-O-p-(4-methyl-5 - carbethoxy - 2-thiazolyl)phenyl phosphorothioate.

References Cited
FOREIGN PATENTS
6,400,465  7/1964  Netherlands.

ALEX MAZEL, Primary Examiner
R. J. GALLAGHER, Assistant Examiner

U.S. Cl. X.R.
424—200